United States Patent
Shiakallis et al.

(10) Patent No.: US 8,646,108 B2
(45) Date of Patent: Feb. 4, 2014

(54) MULTI-DOMAIN SECURE COMPUTER SYSTEM

(75) Inventors: Peter P. Shiakallis, Chesapeake, VA (US); Ed Harvey, Virginia Beach, VA (US); John McGinn, Jr., Virginia Beach, VA (US); Guy Purser, Virginia Beach, VA (US)

(73) Assignee: Secutor Systems, LLC, Chesapeake, VA (US)

( * ) Notice: Subject to any disclaimer, the term of this patent is extended or adjusted under 35 U.S.C. 154(b) by 0 days.

(21) Appl. No.: 13/566,761

(22) Filed: Aug. 3, 2012
(Under 37 CFR 1.47)

(65) Prior Publication Data

US 2013/0091589 A1    Apr. 11, 2013

Related U.S. Application Data

(63) Continuation-in-part of application No. 12/182,913, filed on Jul. 30, 2008, now abandoned.

(60) Provisional application No. 60/952,678, filed on Jul. 30, 2007.

(51) Int. Cl.
| | |
|---|---|
| *G08B 13/24* | (2006.01) |
| *H05K 5/00* | (2006.01) |
| *H05K 7/00* | (2006.01) |
| *G06F 21/86* | (2013.01) |
| *G06F 21/70* | (2013.01) |
| *G06F 1/18* | (2006.01) |

(52) U.S. Cl.
CPC ............... *G06F 21/86* (2013.01); *G06F 21/70* (2013.01); *G06F 1/181* (2013.01)
USPC .............. 726/34; 361/724; 361/725; 361/726

(58) Field of Classification Search
USPC .................................... 726/34; 361/724–726
See application file for complete search history.

(56) References Cited

U.S. PATENT DOCUMENTS

| | | |
|---|---|---|
| 2,214,432 A | 9/1940 | Murphy et al. |
| 5,075,884 A | 12/1991 | Sherman et al. |
| 5,499,377 A | 3/1996 | Lee |
| 5,777,400 A | 7/1998 | Bouthillier |
| 5,884,096 A | 3/1999 | Beasley et al. |
| 5,894,551 A | 4/1999 | Huggins et al. |
| 5,982,616 A | 11/1999 | Moore |

(Continued)

OTHER PUBLICATIONS http://web.archive.org/web/2003041215464/www.chasis-plans.com/custom/custom-showcase.html, dated Mar. 27, 2006.

(Continued)

*Primary Examiner* — Catherine Thiaw
(74) *Attorney, Agent, or Firm* — Williams Mullen

(57) ABSTRACT

Disclosed is a hardware based secure multi-level security computing system system. The system comprises a chassis enclosing multiple separate, secure computer devices or domains, each within an electromagnetic shielding Faraday cage. The chassis structure includes internal electromagnetic shields and other features to prevent cross domain electromagnetic interference or compromising emanations. The chassis may be the size of a standard computer tower. The computer devices or domains may be configured for handling information of different classification levels. Optionally, each of the computer devices may operate on significantly less power than a standard computer. Preferably, each computer operates on no more than 50 Watts of power, more preferably on less than 35 Watts of power.

17 Claims, 9 Drawing Sheets

(56) References Cited

U.S. PATENT DOCUMENTS

| | | |
|---|---|---|
| 5,996,077 A | 11/1999 | Williams |
| 6,026,502 A | 2/2000 | Wakayama |
| 6,389,542 B1 | 5/2002 | Flyntz |
| 6,578,089 B1 | 6/2003 | Simpson et al. |
| 6,878,872 B2 * | 4/2005 | Lloyd et al. ............... 174/384 |
| 7,350,090 B2 | 3/2008 | Baurer et al. |
| 7,469,351 B2 | 12/2008 | Baba et al. |
| 2003/0033361 A1 | 2/2003 | Garnett et al. |
| 2003/0081386 A1 * | 5/2003 | Robillard et al. ........... 361/724 |
| 2004/0032722 A1 * | 2/2004 | Wrycraft et al. ........... 361/725 |
| 2004/0107358 A1 | 6/2004 | Shiakallis |
| 2004/0114322 A1 | 6/2004 | Agata et al. |
| 2004/0240191 A1 * | 12/2004 | Arnold et al. ............... 361/800 |
| 2004/0268166 A1 | 12/2004 | Farkas et al. |
| 2006/0134982 A1 * | 6/2006 | Zarganis et al. ............ 439/607 |
| 2007/0097659 A1 | 5/2007 | Behrens et al. |
| 2007/0138602 A1 * | 6/2007 | Orth et al. .................. 257/659 |
| 2007/0257883 A1 | 11/2007 | Ke |
| 2008/0201506 A1 | 8/2008 | Lee |

OTHER PUBLICATIONS www.tryten.com, dated Mar. 27, 2006.

* cited by examiner

MULTI-DOMAIN SECURE COMPUTER SYSTEM

CROSS-REFERENCE TO RELATED APPLICATION(S)

This application is a continuation-in-part of U.S. application Ser. No. 12/182,913, filed Jul. 30, 2008, which claimed the benefit from U.S. Provisional Application Ser. No. 60/952,678, filed Jul. 30, 2007, all of which are incorporated herein by reference in their entirety.

TECHNICAL FIELD

The present invention relates generally to the field of computer systems, and more particularly, a multi-domain, multi-level security computer system.

BACKGROUND

Definitions

For purposes of convenience without limitation, the following definitions are provided used in this disclosure.

(a) Computer: A computer is a programmable machine designed to sequentially and automatically carry out a sequence of arithmetic or logical operations. Conventionally, a computer may include a 1) processor or Computer Processing Unit (CPU) that carries arithmetic and logical operations, 2) data storage device or memory for temporary storage of data for use by the CPU to read data in order to carry out operations and to write the results of the operations, 3) a processor handling chip or PCH for sequencing and control elements that can change the order of operations and direct communications between the CPU, memory and peripherals, 4) a motherboard and 5) a power source or power supply. The motherboard generally may host the CPU, memory, and PCH control elements in addition to providing communications between the CPU and control elements to connections for various peripheral devices and communications systems external to the computer. The motherboard may or may not also host a video or graphics adaptor to generate information compatible with a monitor or display device. Present day CPUs are trending in the direction of hosting the PCH and the video adaptor capabilities leaving motherboards, for the most part to provide a path to connectors large enough to connect with peripherals, display devices, and network communications.

(b) Peripherals: Peripheral devices or peripherals allow information to be entered (input) into the computer from external sources and allow the results of the computers operations to be sent out (output). Examples of peripherals include, hard disk drives (HDD) for mass data storage, DVD drives for more permanent data storage and data access, Video Adaptors to provide signaling of information to monitors such as Liquid Crystal Displays (LCDs) or Light Emitting Diode (LED) displays, printers, network interfaces to provide a path between other computing devices and remote peripherals, user input devices such as keyboards, mice, and trackballs, to name a few.

(c) Network; a communications system that allows sharing of resources and information among interconnected computers and peripherals. In many cases, the term network extends past the communications system to include the greater realm of the devices connected to the communications system such as the computers and peripherals. The Internet is a network.

(d) Domain: A domain when used as a name is an identification label that defines a realm of administrative autonomy, authority, or control in the Internet Technologies when referring to networks in the greater sense than only communications. In the U.S. Government, domains are often used to refer to parts of the government internet that are segmented into individual network enclaves for purposes of information security. Specifically, the U.S. Government has setup three primary and other associated enterprise networks or domains for UNCLASSIFIED information, SECRET information, and TOP SECRET information. Similarly, non-government organizations also setup separate networks or domains or logically divide networks or domains for purposes of information security. A computer that connects to one of these networks becomes part of the domain.

(f) Multi-Level Security. The Government refers to computing devices and peripherals that can safely operate at more than one security level (i.e., connect to more than one security level or domain network, or more than one category of security) as a Multi-Level Security (MLS) device. Specific certification by a government organization, such as the National Security Agency, is required for all MLS devices prior to that device connecting to more than one government security network of a different security level or category of security. Conventional approaches have been unable to provide an effective desktop multi-level security computing system (also referred to as a multi-domain secure computer system.)

(g) Electromagnetic Field (EMF). An electromagnetic field (also EMF or EM field) is a physical field produced by moving electrically charged objects. It affects the behavior of charged objects in the vicinity of the field. An electromagnetic field extends indefinitely throughout space and describes the electromagnetic interaction. The field can be viewed as the combination of an electric field and a magnetic field. The electric field is produced by stationary charges, and the magnetic field by moving charges (currents); these two are often described as the sources of the field. An electromagnetic field can be regarded as a smooth, continuous field, propagated in a wavelike manner.

(h) Electromagnetic Interference (EMI). Electromagnetic interference is a disturbance caused by an EMF's transference of energy from the source of the EMF to another device or circuit. The source and the affected circuit can be internal to the same device or between two independent devices. The disturbance may interrupt, obstruct, or otherwise degrade or limit the effective performance of an electrical circuit. The source may be any object, artificial or natural, that carries rapidly changing electrical currents or magnetic fields (EMF), such as another adjacent electrical circuit. A Computer Processing Unit (CPU) accomplishes its tasks through rapid switching of electrical current. A power supply is another example. Therefore, a CPU is a source of an EMF and can cause EMI to adjacent circuits. EMI can be intentionally used for jamming, as in some forms of electronic warfare. Additionally, the ability to listen to the emanations of EMF/EMI from a CPU or other parts of a computer exists and can be recorded and processed into meaningful information.

BACKGROUND DESCRIPTION

The U.S. Government protects information sensitive to the country's national security (whether written, printed, spoken, or electronic), by categorizing the sensitivity of information and assigning it to a category referred to as "security classification." Generally speaking, the classifications are characterized as UNCLASSIFIED (least level of protection for sensitive information, but includes official use only) SECRET (more sensitive) and TOP SECRET (most sensitive). Each category of classification is assigned procedural and electronic protection measures. Additionally, within these three broader classifications, additional subcategories have been created directing special handling of the information to further protect the sensitivities associated with information origin or content, and/or to limit the number of persons having access to the information.

To disseminate and allow for global access of information in these security classifications, the U.S. Government supports individual, isolated, physically and logically separated, enterprise networks and domains. The networks are protected by a number of technologies with the level of protection increasing dependent upon the sensitivity associated within each classification and sub classification. In the civilian sector (such as the medical, financial, utility, legal, and other industries) similar concepts exist for protecting information for personal or financial data, national security infrastructure or systems (power grids, waterway control, etc.), and client-doctor/attorney relationships. In the civilian sector however, most often protection is accomplished by logically (as opposed to physically) separating public access networks from internal, sensitive networks through devices referred to as "firewalls," which creates an inner domain connected to but protected from the public access Internet. The difference here is that the civilian sector often uses a single network, logically divided into two domains procedurally limiting what can enter or exit a local site. The U.S. Government maintains physically separate, global, duplicative, isolated, and access controlled networks. The concept of protecting information based on "separation and control" of data is clearly the most common practice of information security in both the government and civilian sectors.

Vulnerabilities, even when data has been physically or logically separated, are many. Perhaps the most significant is the vulnerability created by the human operator, where through either a malicious or unintentional act, the human allows information from one classification to be mixed with information of a second classification, creating a potential for unintended release of information. This may be exemplified by information residing on one network or domain exchanged or transferred to a second network or domain of differing data sensitivities (different classification) thereby exposing the information to persons not "cleared" or not authorized to hold that information. When this exposure occurs, it is referred to as "compromising data or information." Therefore, protection of the data by procedural and electronic logic is referred to as access control. Access control is implemented and achieved through procedures (e.g. controlling access to a building or space where a computer or network may be placed, or controlling access to the internal components of a computer), electronic measures (e.g. password protection to a computer on a network), or in some cases, a combination of both (e.g. issuance and use of a personal SMART Cards for users.) In an attempt to limit risks associated with vulnerability, government and non-government managers of information place into practice procedural and electronic "access control" measures.

When organizations implement multiple, separated networks for security purposes, any computer used to access information on these networks is physically or logically connected to only one network at a time, in order to minimize the possibility that information on a network might be inadvertently transmitted to a network with a different classification. Therefore, a user must have a separate computer connected to each of the different, separated networks. When multiple networks and computers are used, the physical work space becomes dominated by the requirement to provide multiple computers to every such user. While this approach can separate information of concern, other vulnerabilities are created and new problems are introduced to the workspace. For instance, new vulnerabilities are introduced with respect to EMF/EMI and access control. Due to the vulnerabilities to data presented by EMF/EMI, standard computers must be separated by a specified distance (e.g., about one meter of separation between computers residing on each network classifications is specified by the U.S. Government). Such requirements crowd workspaces and expand space requirements. Each desk space must offer at least 72-inches (plus the width of the computers) of floor space, if three computers are required. The spacing and positioning of adjacent workspaces is driven by the placement of computer at the first workspace. Multiple keyboards/mouse and monitors are required for each computer on separated networks. Each keyboard/mouse and monitor require either individual wiring or require wiring to a Keyboard, Video, Mouse (KVM) switch that is implemented to combine operations of a single set of Keyboard, Mouse, and monitor to multiple computers. But even with a traditional KVM switch, the workspace is still cluttered with multiple wires; such wires have exposed connections, introducing potential vulnerability for mis-wiring or misuse. Further, when multiple levels of security are introduced into a single workspace, the issue of controlling personnel access to all of the security classifications of computers becomes another issue. If any of the users in the workspace do not have the same level of "clearance" (i.e., permissions to access all of the information of all the classifications), then additional access control features and procedures must be implemented. Computers of the highest level security classifications must be protected from those not holding the correct clearance. All of these measures are expensive to the Government. The separation of computers cost the Government in terms of the size of work centers in order to separate computers.

Prior designs of a hardware based multilevel computer systems include, for example, (1) the use of complicated mechanical switching mechanisms (see U.S. Pat. No. 6,009,518), (2) the addition of complex circuitry with relays and microprocessors controlled via automatic teller machine (ATM) styled keypads requiring a personal identification number (PIN) for switching from one network domain to another domain. (see, e.g., U.S. Pat. Nos. 6,389,542, and 6,351,810), and (3) the use of EMI barrier walls between computing components (see, e.g., U.S. Pub. No. 20040107358). In the cases of approaches (1) and (2), the systems result in a total loss of data and operator awareness when switching domains and a significant amount of time is lost during switching, because such switching between domains/computers includes operating system and computer shutdown to disconnect from the first network domain and then re-startup of the computer on the second network. In the case of the third approach, it has been discovered that the barrier wall is insufficient to adequately protect the electronic data of the individual computers from one another.

BRIEF SUMMARY OF THE INVENTION

The present approach is directed to a hardware based, multi-domain, multi-level computer system through the use of multiple computers housed within a single chassis. Some computer manufacturers build computers such as servers with multiple elements internal to a single chassis, generally with some form of common power supply or other power sharing arrangements for efficiency. That approach does not meet the security standards for the purposes of multi-level security required to safeguard against vulnerabilities created when computers are located within close proximity to one another within a single chassis. Others have attempted approaches using a barrier wall, but this has been found ineffective to shield propagation and provide the required protection from EMF. The industry has not offered an approach that provides multiple computers with their own, single shielded (Faraday Cage) sub-enclosures with specialized access control features preventing tampering with the computer's inner components or network connections. Industry, the U.S. Government, and many foreign governments may have specifications for the operation of computers in close proximity, but the present approach is the only design to date that will safeguard against the vulnerabilities of such proximity in a single chassis.

Data may be compromised via rapidly changing electromagnetic fields (or EMF energy) when physical components or wiring are in close proximity to one another. As discussed above in the Background, this may be referred to as electromagnetic interference (or EMI), bleed over, or cross talk. Two general vulnerabilities exist to data in concern of EMF energy propagation. First, there is a possibility of one computer "jamming" another computer if the EMF generated by the first is "loud" enough (or of sufficient strength of propagated energy) to interrupt the logical operations of the second computer. This is referred to as EMI. Second, if two computers are in close enough proximity to one another, there is a risk or potential a user may "listen" to the generated EMF (or compromising emanations) of the first computer from the second computer. While some efforts have been made to develop single domain computer enclosures that reduce the latter issue of compromising emanations from outside of a chassis (e.g., TEMPEST certified computers), there are no effective approaches to addressing both issues in multi-domain, multi-level computer systems.

EMFs may extend in three directions, theoretically, infinitely. A simple barrier between two computers within a single chassis has been found insufficient to avoid EMI; physically, such a barrier would need to extend infinitely to prevent propagation of the field from passing around the barrier. In practice, a simple barrier needs to substantially exceed the dimensions of the computer. Further, any difference in material between a barrier and a chassis has been found to introduce discontinuities; the difference in conductive properties of the two materials of the barrier and chassis disturbs the EMF, and collects energy at the seams. This collection of energy at the seam can propagate EMF through the barrier walls. A final consideration is that some approaches have suggested the use of an iron chassis, which could introduce an awkward weight on the order of 300 pounds for such a device.

For the purpose of use herein, a Faraday cage may be considered an enclosure formed with a conductive material, sometimes as conductive mesh. Such an enclosure is intended to block external static and non-static EMF. Its operation depends on the fact that an external static electrical field will cause the electrical charges within a cage's conducting material to redistribute, so as to cancel the field's effects within the cage's interior rather than allow the effects to propagate out. Such a cage may also shield the interior from external EMF forces if the conductor is thick enough and any holes are engineered to be smaller than the wavelength of the radiated EMF. For example, certain computer forensic test procedures of electronic systems that require an environment free of electromagnetic interference can be carried out within a screen room. These rooms are spaces that are completely enclosed by one or more layers of a fine sheet metal or perforated sheet metal. The metal layers are grounded in order to dissipate by conducting the energy along their dimensions any electric currents generated from external or internal electromagnetic fields, and thus they block a large amount of the electromagnetic interference. The reception or transmission of radio waves, a form of electromagnetic radiation, to or from an antenna within a Faraday cage are heavily attenuated or blocked by a Faraday cage. A microwave oven provides an example of a form of inside out Faraday cage, keeping EMF/RF energy within its cage rather than keeping it out.

Embodiments disclosed herein include a multi-level computing system having a single outer housing or chassis. The chassis is preferably the size of a standard computer mid tower chassis, but can be larger or smaller.

The system's single chassis encloses multiple, separate computers. It is preferred that at least three computers are disposed within the system's single chassis. In other contemplated embodiments, fewer or more than three computer devices may be enclosed within the chassis.

Each of the computers has an individual or dedicated power supply, separate and isolated from the power supplies of the other internal computer devices, thereby isolating data transfer from common power switching across a single electrical conductor path of a common power supply.

Each internal computer is a separate physical instantiation of a computer consisting of a motherboard, a CPU, memory, and power supply. In other words, these components are dedicated to a particular computer. Additional internal peripheral devices such as a hard disk drive, solid state hard disk drive, Compact Flash memory, optical disk reader and or writer, card reader, video adaptor card, network interface card, or any other computer component may be included, but each is dedicated to one and only one of the isolated computers with the exception of an internal keyboard mouse, and video switch, as discussed herein.

The chassis may be constructed so that it is divided into isolated, shielded compartments or chambers established as separate Faraday cages. Each computer shall be housed in its own chamber/compartment that is a Faraday Cage. The chambers will thus wrap each computer domain in total, on all six sides or walls of the chamber volume. These six walls form an effective EMF shield, with the walls configured so as to eliminate slot antenna effects along the seams of the walls. In this way, a Faraday cage (where EMF energy produced by each isolated computer), does not impact the operation of the other computers that reside within the chassis, nor can the operation of one computer be "heard" from the chamber in which another computer is hosted. The properties of the material used to construct the chassis and the design of chambers in regards to EMF propagation, prevent the passage of any significant EMF energy between each chamber within the chassis.

All chassis components are constructed of principally the same material with common electrical and magnetic conductivity properties, or a coating over the material with common properties of electrical and magnetic conductivity, such that they will equally propagate EMF energy across their surfaces rather than allowing the EMF energy to pass through the material or to reshape the field where energy buildups in the field would pass and result in potential EM interference.

Because each isolated computer is "wrapped" in a Faraday Cage arrangement, it is not possible to "listen" to the EMF propagated by a computer inside of one chamber from an adjacent chamber within the chassis, nor is it possible for one internal computer to interfere with another computer's operation through EMI or "jamming."

Likewise, due to the materials and construction of the chambers, listening and interference between internal computers and external computers or producers of EMF is also prevented. If the computers internal to the device are isolated from one another, then they would also be isolated from devices external.

The six walls of the chambers shall be manufactured with a sufficiently high tolerance so that when assembled, all six walls of the three chambers/Faraday Cages are tightly mechanically connected, welded, or meshed and at the same electrical and magnetic potential so that EMF is evenly dispersed within the chamber, energy is propagated across all the walls of the compartment and does not excessively collect and penetrate the wall seams or corners of the compartments. Unlike a single two dimension barrier (with which the EMF will extend over the top, bottom, or ends), use of mechanical connections, welding, or meshing the six walls of the cage together will ensure the field remains effectively within the chamber.

A potential Keyboard Mouse (KM) or Keyboard Video Mouse (KVM) switch may be included internally mounted within one of the compartments of the chassis or its own chamber of the chassis.

The internal computers within the chassis shall be physically isolated in their respective chamber except where a common KM or KVM is used. Wiring between each computer and the KM/KVM switch must be shielded to prevent transmission of EMF among the chamber through the KM/KVM wiring acting as an antenna between chambers. Wiring for a potential Keyboard/Mouse or Keyboard/Video/Mouse switch shall pass between the chambers in a manner that prevents EMF propagation between chambers and/or may be grounded at the same electric potential as the Faraday Cages. For convenience of reference, this is referred to as a "shielded" KM or KVM switch.

Design and construction of the chassis and chamber walls shall eliminate openings that physically form slots between chambers or to the outside of the chassis. Slots in the construction create the physics based principle of a "slot antenna" which realigns the field, focusing EMF energy along the slot, and effectually amplifies and directionally broadcasts the energy, in this case either between the computing domains or external to the chassis, depending on the location of a "slot".

Components of the chassis, where required to prevent slot antenna, may be sealed with special conductive materials such as EMF gasket material at assembly time. EMF gasket material comes in many forms.

All penetrations in the chassis and internal chambers/compartments for the purposes of switches or connectors shall be isolated to either the front or rear walls of the chassis to prevent as much of the radiated EMF from crossing boundaries between the compartments of the three isolated computers or from the field aligning outside of the external chassis and effecting another computer domain be effectively re-entering the chassis.

Where switches or connectors penetrate the front or rear of the chassis, they will be composed of a material of similar properties of conductivity to the outer chassis. For instance, switches may be made of copper or brass with a nickel cladding or surface to disrupt the field as little as possible.

Holes in the front or rear of the chassis, such as ventilation holes, may be used in the chassis construction, but these may be engineered specifically in consideration of propagation of EMF. The holes may be engineered with reference to or for the size of the wavelength of the propagated energy to prevent or attenuate the energy transmitted within the chassis between internal chambers or compartments, or external to the chassis from any such chamber or compartment. External covers or panels of the chassis may be joined with continuous welds or flanges to occlude EMF incident on the seams or line of joinder.

Where holes are required to be large in comparison to the propagated wavelength, special EMF protective materials such as EMF mesh shielding, may be used to arrest the detrimental effects of the propagation of EMF energy. Such materials may be tailored to the specific application, but generally those appropriate for occluding microwave propagation function well for the present approach. Such as in the case where ventilation fans may be desired in the rear of a chassis. The aperture of the ventilation fan opening may be covered with a mesh EMF shield and that shield may be grounded to the chassis to achieve a common electrical potential.

Access to the internal components of the chassis may be facilitated by means of the top which may include or form an access cover plate or top access cover. This top access cover may be designed to prevent routine access to the internal computer components within the chassis. This design may be facilitated by a lock or other similar feature that prevents access to the internal components of the computer unless a key or special tool is used.

The rear of the chassis may have a removable "rear peripheral cover" or plate that may be customized to user preferences. This rear peripheral cover may be designed so that it is constructed of the same material as the rest of the chassis and fastened in such a manner that it fits tightly to the rest of the chassis to provide a continuous electrical potential. As with the top, special EMF gasket material may be used to assist in the tight fit, sealing, and electrical potential of the rear peripheral cover to the chassis when assembled.

The connectors to the network connections and peripheral devices such as USB ports, keyboard and mouse ports, and video connections may be protected by a cover and lock or similar secure mechanism. The lock or feature that protects entry into the chassis internal components may also be the same locking mechanism that locks the peripherals from access.

The internal computer components may have the additional access control feature of an electro-mechanical key lock in order to start the internal computers that control power to the power supply or motherboard. This key lock may control all three power supplies or each power supply may have a separate key and lock.

The system may further include additional access control features such as locks, smart cards, and encryption.

The system further supports multiple monitors, each monitor or group of monitors corresponding to a specific internal computer. However, in some instantiations, a KVM switch can be used to switch the video output of each computer to a single monitor.

In general, the multi-level security computing system may have a chassis having a front, top, bottom, and two sides, each comprising an electromagnetic shield. Within the chassis are a first, second, and third computer domain. Internal electronic components are dedicated by domain, such that: a first computer domain comprises a first motherboard, a first dedicated bus, a first processor, a first data storage device, and a first dedicated power supply; a second computer domain comprising a second motherboard, a second dedicated bus, a second processor, a second data storage device, and a second dedicated power supply; a third computer domain comprising a third motherboard, a third dedicated bus, a third processor, a third data storage device, and a third dedicated power supply. Optionally, the chassis may be adapted to mount to a standardized 19-inch rack.

The first, second, and third computer domains are enclosed within the chassis, with a first internal electromagnetic field shield located inside the chassis and interposed between the first computer domain and the second computer domain to prevent data migration between the first computer domain and the second computer domain, and a second internal electromagnetic field shield located inside the chassis and interposed between the second computer domain and the third computer domain to prevent data migration between the second computer domain and the third computer domain. An aspect of this is that the first and second internal electromagnetic shields are in the form of a first and second wall with the first wall having a first perimeter and the second wall having a second perimeter, the first perimeter in operable engagement with the chassis defining a first seam between the first perimeter of the first wall and the chassis, the chassis and first wall configured with a first flange along the first seam to occlude an electromagnetic field from the first or second computer domain incident on the first seam, the second perimeter in operable engagement with the chassis defining a second seam between the second perimeter of the second wall and the chassis, the chassis and second wall configured with a second flange along the second seam to occlude an electromagnetic field from the second or third computer domain incident on the second seam.

The first computer domain, the second computer domain and the third computer domain are separated and electrically isolated so that no information is shared between or among any of the first computer domain, the second computer domain, and the third computer domain. In addition, the chassis with the first and second electromagnetic field shields being configured to form a first, second, and third Faraday cage about the first, second, and third computer domains respectively. Access control may optionally be provided, with the chassis having a plurality of covers, such as a top and back covers. These covers may provide access to at least a portion of the interior of the chassis and prevent unauthorized access to the chassis.

A number of aspects or options are also disclosed. The multi-level security computing system may have one or more user data input devices; a user data input selector switch for alternatively coupling the one or more user data input devices to the first computer domain, the second computer domain, and the third computer domain without rebooting any of the first computer domain, the second computer domain, or the third computer domain; and wherein the first computer domain, the second computer domain, and the third computer domain are adapted to be operational at the same time.

A number of aspects or options are also disclosed. In some embodiments, the multi-level security computing system, the chassis and one or both internal electromagnetic field shields or walls may be fabricated of an aluminum alloy, forming aluminum Faraday Cages. Optionally, a variety of user data input devices may be provided, with a user data input selector switch for alternatively coupling the one or more user data input devices to the first computer domain, the second computer domain, and the third computer domain without rebooting any of the first computer domain, the second computer domain, or the third computer domain; and wherein the first computer domain, the second computer domain, and the third computer domain are adapted to be operational at the same time. In some embodiments, one or more user interface devices may include a keyboard and a mouse.

In some embodiments, at least one of the second computer domain and the third computer domain is a secure computer domain and the multi-level security computing system further comprising a smart card access controller for authenticating users prior to allowing access to the secure computer domain. In another embodiment, the first domain may be accessed by a user without smart card authentication. Optionally, a key-lock power switch may be included, the switch having an associated key for powering on the first computer domain, the second computer domain, and the third computer domain. A first reset button may be included for resetting the first computer domain without resetting the second computer domain or the third computer domain; a second reset button for resetting the second computer domain without resetting the first computer domain or the third computer domain; and a third reset button for resetting the third computer domain without resetting the first computer domain or the second computer domain. Power consumption may vary from 35, 50, 105, or 150 watts, depending on the application.

Further access control may be provided by a top panel lock for controlling access to internal components of the computer through a top panel.

The system may have a display with a first video monitor associated with the first computer domain; a second video monitor associated with the second computer domain; and a third video monitor associated with the third computer domain. Optionally, the first video monitor may be adapted to display information from the first computer domain, the second video monitor adapted to display information from the second computer domain, the third video monitor adapted to display information from the third video domain, wherein the first, second, and third video monitors are adapted to simultaneously display information.

These and other features as well as advantages, which characterize the various preferred embodiments of present invention, will be apparent from a reading of the following detailed description and a review of the associated drawings.

DETAILED DESCRIPTION OF PREFERRED EMBODIMENTS

Figure 1:
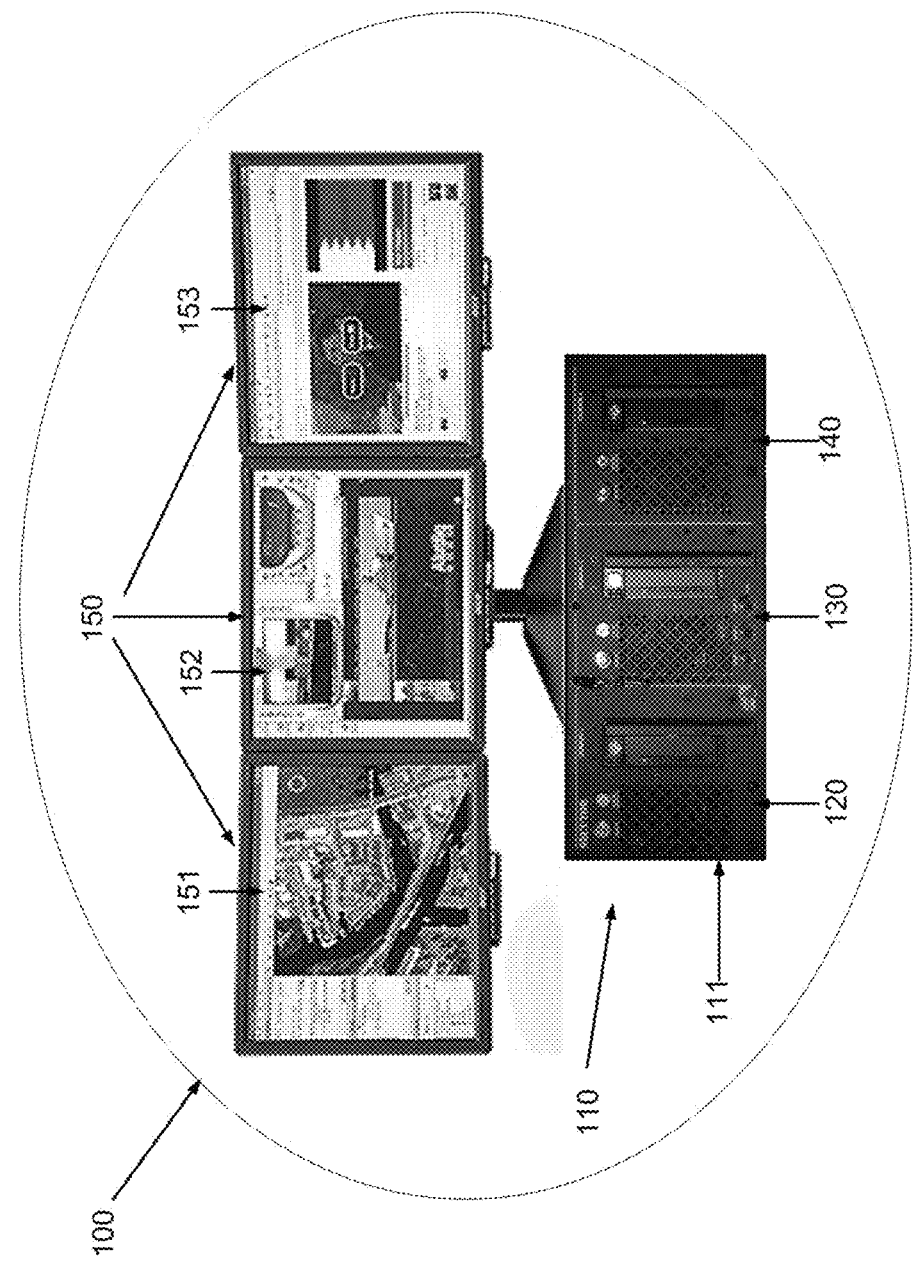
FIG. 1 illustrates an exemplary embodiment of a system of the present invention.

Referring now to the drawings, in which like numerals represent like elements, exemplary embodiments of the present invention are herein described.

FIG. 1 illustrates an exemplary embodiment of a multi-level security (MLS) computing system 100, making use of the MLS computer or computing unit 110. The system 100 comprises a multi-level security computer or unit 110 in a single chassis 111, and is generally included with display system 150. Chassis 111 defines a plurality of internal chambers 121, 131, 141 (shown, e.g., in FIG. 5) within which are a plurality of computer domains, shown in this embodiment as computer domains 120, 130, 140. The chassis 111 may be constructed from lightweight, high strength material, which is also highly conductive of electromagnetic energy, such as aluminum.

As noted above, all chassis components are preferably constructed of principally the same material with common electrical and magnetic conductivity properties, or a coating over the material with common properties of electrical and magnetic conductivity, such that they will equally propagate EMF energy across their surfaces rather than allowing the EMF energy to pass through the material or to reshape the field where energy buildups in the field would pass and result in potential EM interference. The following table represents materials with the highest electrical conductivity.

| Material | $\rho$ ($\Omega \cdot m$) at 20° C. | $\sigma$ (S/m) at 20° C. |
| --- | --- | --- |
| Silver | $1.59 \times 10^{-8}$ | $6.30 \times 10^7$ |
| Copper | $1.68 \times 10^{-8}$ | $5.96 \times 10^7$ |
| Annealed copper | $1.72 \times 10^{-8}$ | $5.80 \times 10^7$ |
| Gold | $2.44 \times 10^{-8}$ | $4.10 \times 10^7$ |
| Aluminum | $2.82 \times 10^{-8}$ | $3.5 \times 10^7$ |
| Calcium | $3.36 \times 10^{-8}$ | $2.98 \times 10^7$ |
| Tungsten | $5.60 \times 10^{-8}$ | $1.79 \times 10^7$ |
| Zinc | $5.90 \times 10^{-8}$ | $1.69 \times 10^7$ |
| Nickel | $6.99 \times 10^{-8}$ | $1.43 \times 10^7$ |
| Lithium | $9.28 \times 10^{-8}$ | $1.08 \times 10^7$ |
| Iron | $1.0 \times 10^{-7}$ | $1.00 \times 10^7$ |

The following table compares materials to resistivity density.

| Material | Resistivity ($n\Omega \cdot m$) | Density ($g/cm^3$) | Resistivity-density product ($n\Omega \cdot m \cdot g/cm^3$) |
| --- | --- | --- | --- |
| Sodium | 47.7 | 0.97 | 46 |
| Lithium | 92.8 | 0.53 | 49 |
| Calcium | 33.6 | 1.55 | 52 |
| Potassium | 72.0 | 0.89 | 64 |
| Beryllium | 35.6 | 1.85 | 66 |
| Aluminum | 26.50 | 2.70 | 72 |
| Magnesium | 43.90 | 1.74 | 76.3 |
| Copper | 16.78 | 8.96 | 150 |
| Silver | 15.87 | 10.49 | 166 |
| Gold | 22.14 | 19.30 | 427 |
| Iron | 96.1 | 7.874 | 757 |

The inventors have discovered that aluminum is a preferred material, with a conductivity 3.5×107 (S/m) and a density of 2.70 (g/cm3). It provides sufficient conductivity in thin sheets to be light in weight, of good structural strength, and of feasible expense. While other materials may be suitable, such as copper or various alloys, depending on the application and financial or weight considerations, aluminum is appropriate for many common applications. Prior efforts often focused on materials that were either impractical due to rarity and cost, or impractical due to material characteristics. For example, dense materials such as iron would be impractical for the application due to the weight of the end product (as noted above, on the order of 300 pounds or more.)

Figure 3:
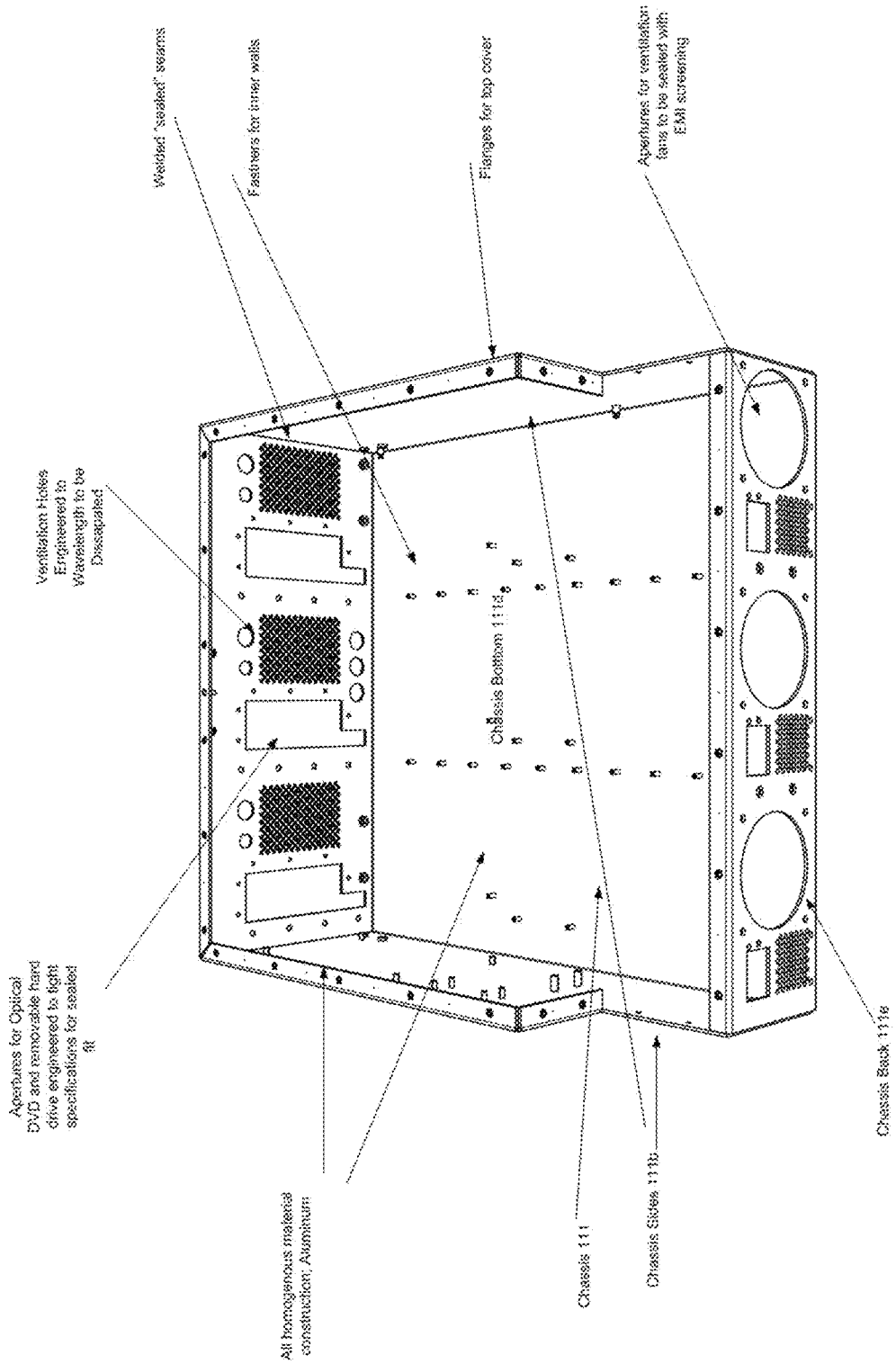
FIG. 3 illustrates a front view of processing unit.
Figure 7:
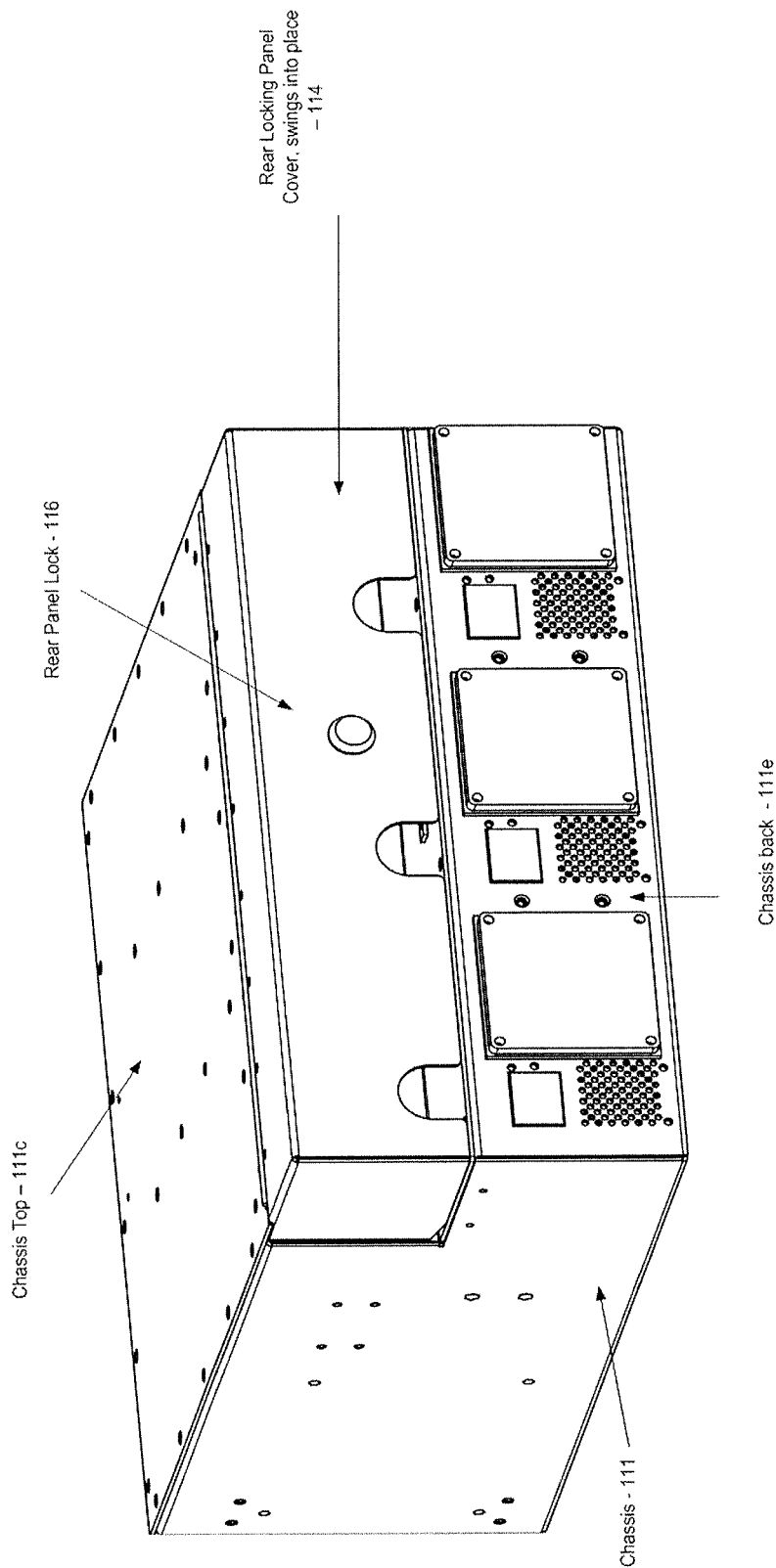
FIG. 7 is illustrates an internal view of the chassis during assembly

By way of an overview, FIG. 1 shows front 111a of chassis 111 (for reference of perspective, sides 111b, back 111e, and bottom 111d may be seen in FIG. 3, while top 111c and back 111e may be seen in FIG. 7) FIG. 3 shows chassis 111 open for assembly, while FIG. 7 shows chassis 111 after assembly. As shown in FIG. 7, any access doors to an interior of chassis 111 may have security locks such as lock 116 in rear peripheral cover 114, for limiting access to peripherals, cables, or components within chassis 111. In a contemplated embodiment, the chassis 111 may be sized and configured to be mounted on a standardized (EIA 310-D, IEC 60297 and DIN 41494 SC48D) 19-inch rack.

Figure 4:
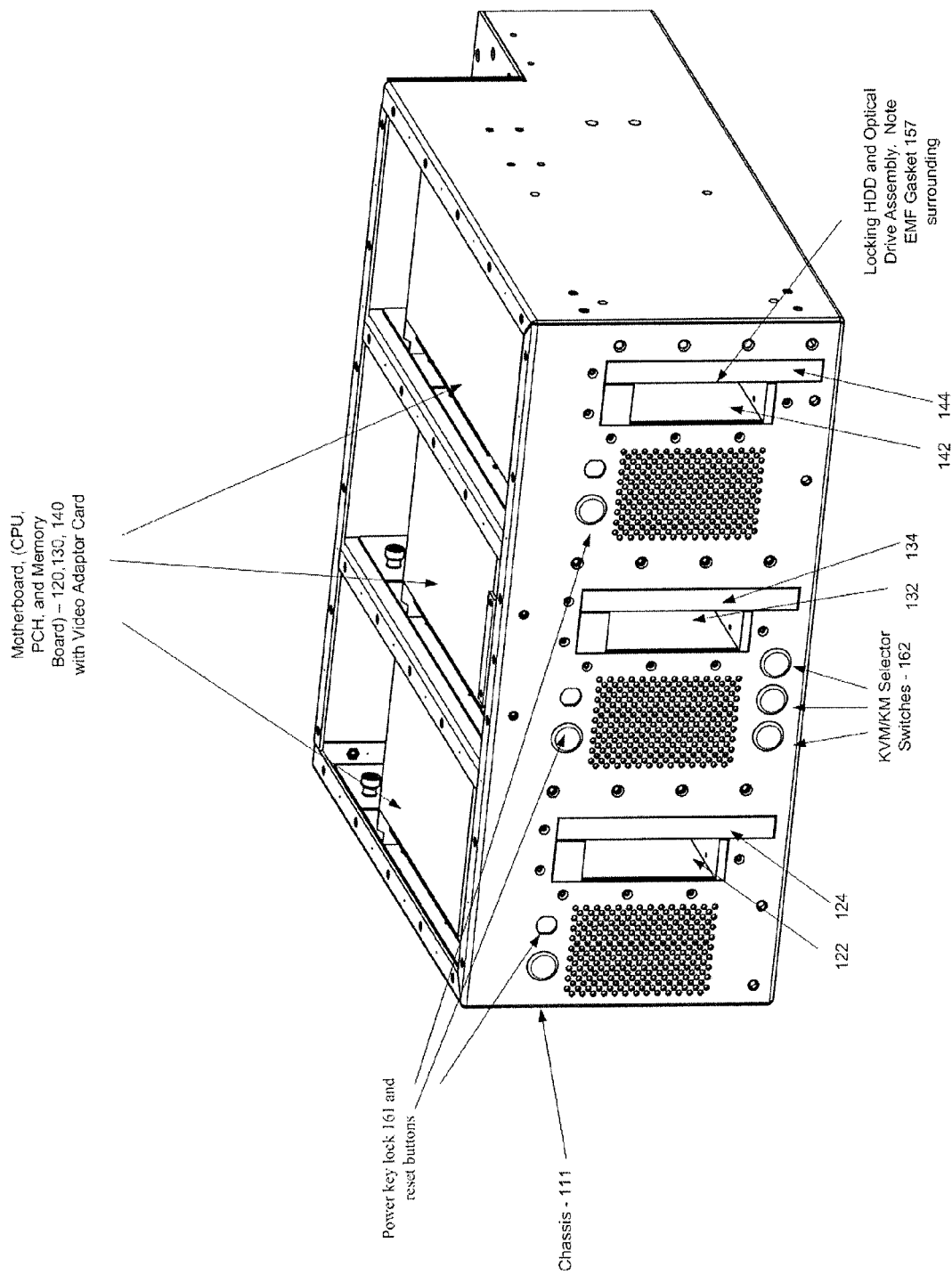
FIG. 4 illustrates a back view of a processing unit.

The MLS computing unit 110 may comprise a plurality of computer domains, each enclosed within a dedicated or separate chamber 121, 131, 141 of chassis 111 as best seen in FIG. 4. For example, the MLS computing unit 110 may comprise a first computer domain 120, a second computer domain 130, and a third computer domain 140 with each located in its own, dedicated or corresponding chamber 121, 131, and 141. Computer domains 120, 130, 140 may have different levels of security classification depending on the user's requirements and/or preferences. For example, computer domains 120 may be UNCLASSIFIED, computer domain 130 may be SECRET, and computer domain 140 may be TOP SECRET.

The display system 150 may be any number of types of displays, so long as they are adapted for the number of computer domains and application. Display system 150, for example, may be a single or multiple monitor embodiment, as required for displaying the output of the various computer domains. Further, the type and number of video output of the internal computer domains depend on desired motherboards and/or any video adaptors. A consideration is the ability to simultaneously display such output. As shown for the embodiment in FIG. 1, display system 150 may comprise a first monitor 151, a second monitor 152, and a third monitor 153, each corresponding to a respective computer domain.

Figure 2:
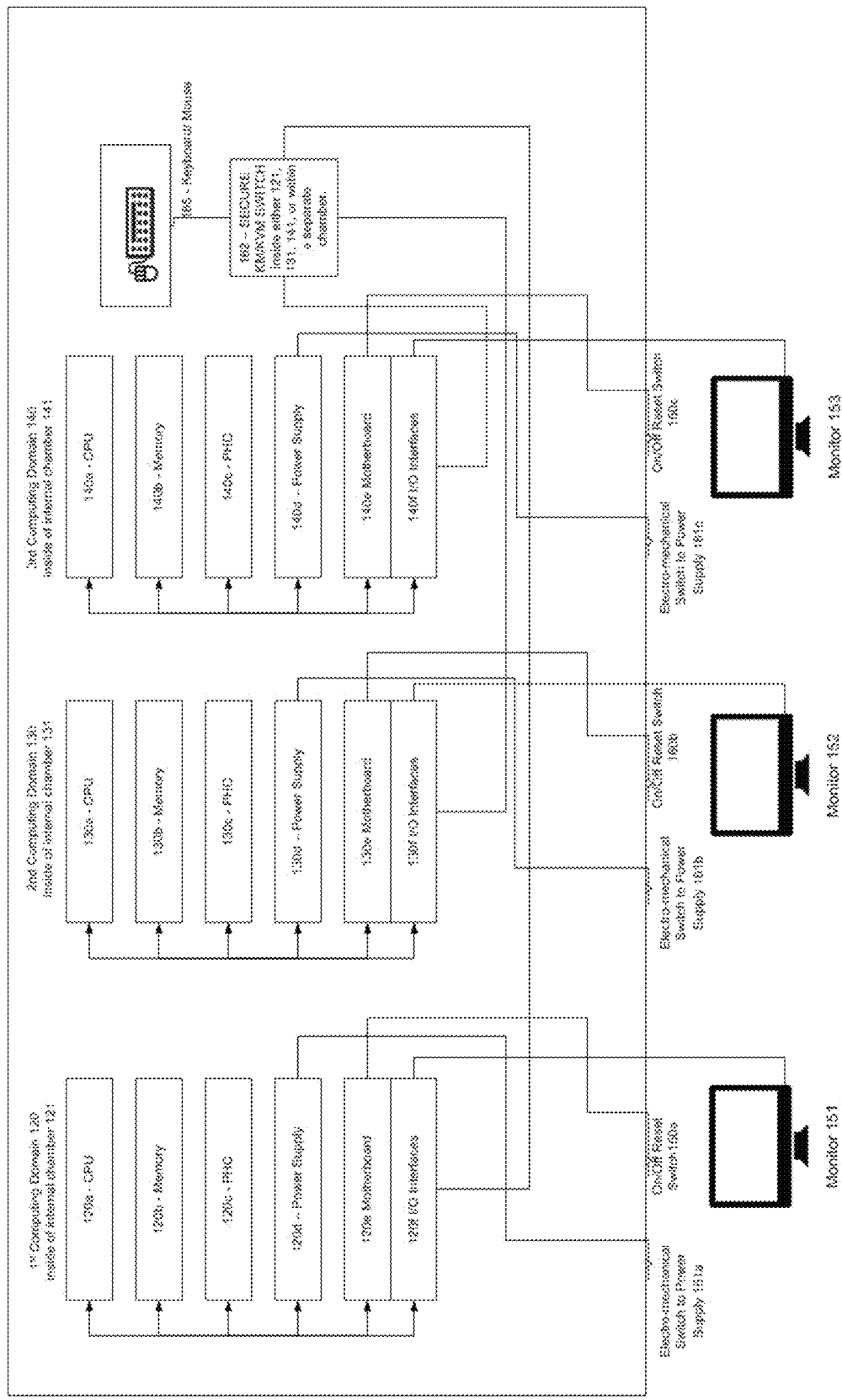
FIG. 2 illustrates a block diagram of a processing unit.

FIG. 2 illustrates a block diagram of MLS computing unit 110. Within chassis 111 are independent computer domains 120, 130, and 140 that include, but are not limited to, computing hardware and electronics necessary for executing a computer operating system. Computer domains 120, 130, and 140 include, respectively, a processor or CPU 120a, 130a, 140a (i.e., for convention, such structure may also referred to as first CPU 120a, second CPU 130a, and third CPU 140a, etc.), a memory or data storage device 120b, 130b, 140b, a PHC 120c, 130c, 140c, a dedicated power supply 120d, 130d, 140d, a motherboard 120e, 130e, 140e (with dedicated internal and external bus), and peripheral I/O interfaces 120f, 130f, 140f. It may also include other devices such as a HDD, an optical drive, video adaptor, smart card drive or reader, or other conventional computer devices. Optionally, the electronic components of the enclosed computer domains 120, 130, and 140 may be miniaturized, and may use computing components designed for mobile applications to reduce power consumption. In practice, the shape and footprint may be customized to accommodate miniaturized components, depending on the application.

Each individual or independent computer domain 120, 130, 140 may be controlled, started, re-booted, etc., independently, without affecting the others. Each computing domain 120, 130, 140 may have its own electromechanical switch associated with dedicated power supplies 120d, 130d, 140d, that may control (energize or de-energize) its respective power supply for access control. Normal dedicated reset switches may also be provided.

Depending on the application, a Keyboard/Video/Mouse (KVM) or Keyboard/Mouse (KM) selector switch may be provided, which is sometimes referred to as KM/KVM Switch 162. A KM switch may be used to associate computer domains with a single keyboard and mouse. Some applications may require a dedicated monitor or monitors to each computer domain while other users may re-associate a single monitor display among each computer along with the keyboard and mouse with a KVM switch. FIGS. 1 and 2 illustrate a configuration where display system 150 comprises three separate monitors 151, 152, 153, which may be associated one to each of computer domains 120, 130, 140.

FIG. 3 illustrates the outer chassis, 111, of an embodiment. Note the outer chassis 111 may be constructed of the same material, in this case aluminum, with welds at the abutments and four corners of the front 111a, back 111e, sides, 111b, top 111c (not shown), and bottom 111d. Also shown are fasteners 119 in the bottom 111d of chassis 111 for securing the first and second internal barrier walls 125, 135 (not shown) that will make internal sides of the internal Faraday cages. Also note the ventilation holes in the outer chassis engineered to a size smaller than the wavelength of the propagated frequency of the EMF.

FIG. 4 shows an open outer chassis 111, with first and second internal electromagnetic shields in the form of internal barrier walls 125, 135. Internal walls 125, 135 may be installed and mechanically fastened at their respective first and second perimeters to the bottom 111d, front 111a, and back 111e of chassis 111. When rear cover 114 and top cover 113 (not shown) are installed, chassis 111, with walls 125, 135 separates and compartmentalizes computer domains 120, 130, 140 (not shown) within chambers 121, 131, 141; these chambers form multiple Faraday cages, shielding each computer domain from EMF of the other computer domains. Note the EMF gasket material 157 at the top perimeter of internal barrier walls 125, 135 to seal the seam formed with top 111c (not shown).

In particular, first wall 125 may be viewed as having a first perimeter and second wall 135 may be viewed as having a second perimeter. The perimeters of first and second walls 125, 135 are in operable engagement with chassis 111, defining a corresponding first and second seam with outer chassis 111 (i.e., front 111a, top 111c, back 111e, and bottom 111d). First wall 125 is configured with a first flange 125f along the first seam and second wall 135 is configured with second flange 135f along the second seam. Operable engagement may be accomplished by a plurality of fasteners 119 shown fastening first and second walls 125, 135 to chassis 111; fasteners 119 may be fabricated of the same material as chassis 111 to reduce differences in conductivity. In this view, it may also be seen that EMF gasket material 157 may be provided at the seams formed with first and second walls 125, 135 to further impair the potential for forming slot antennae.

Thus, in this exemplary embodiment, the first computer domain 120 and second computer domain 130 are separated internally by a first wall 125. The second computer domain 130 and third computer domain 140 are separated internally by a second wall 135. First and second flanges 125f, 135f, with fasteners 119 and EMF gasket material 157, operate to occlude EMF incident on the respective first and second seams formed by first and second walls 125, 135 at chassis 111. In this way, first and second walls 125, 135 may be electromagnetic field shields within chassis 111 and, with chassis 111, operate to prevent data migration across domains. First and second walls 125, 135, along with the other portions of chassis 111, are thereby configured to form three Faraday cages about chambers 121, 131, 141 and each computer domain, thereby preventing data migration via EMF among domains, and EMF propagation outside chassis 111 as well.

Figure 5:
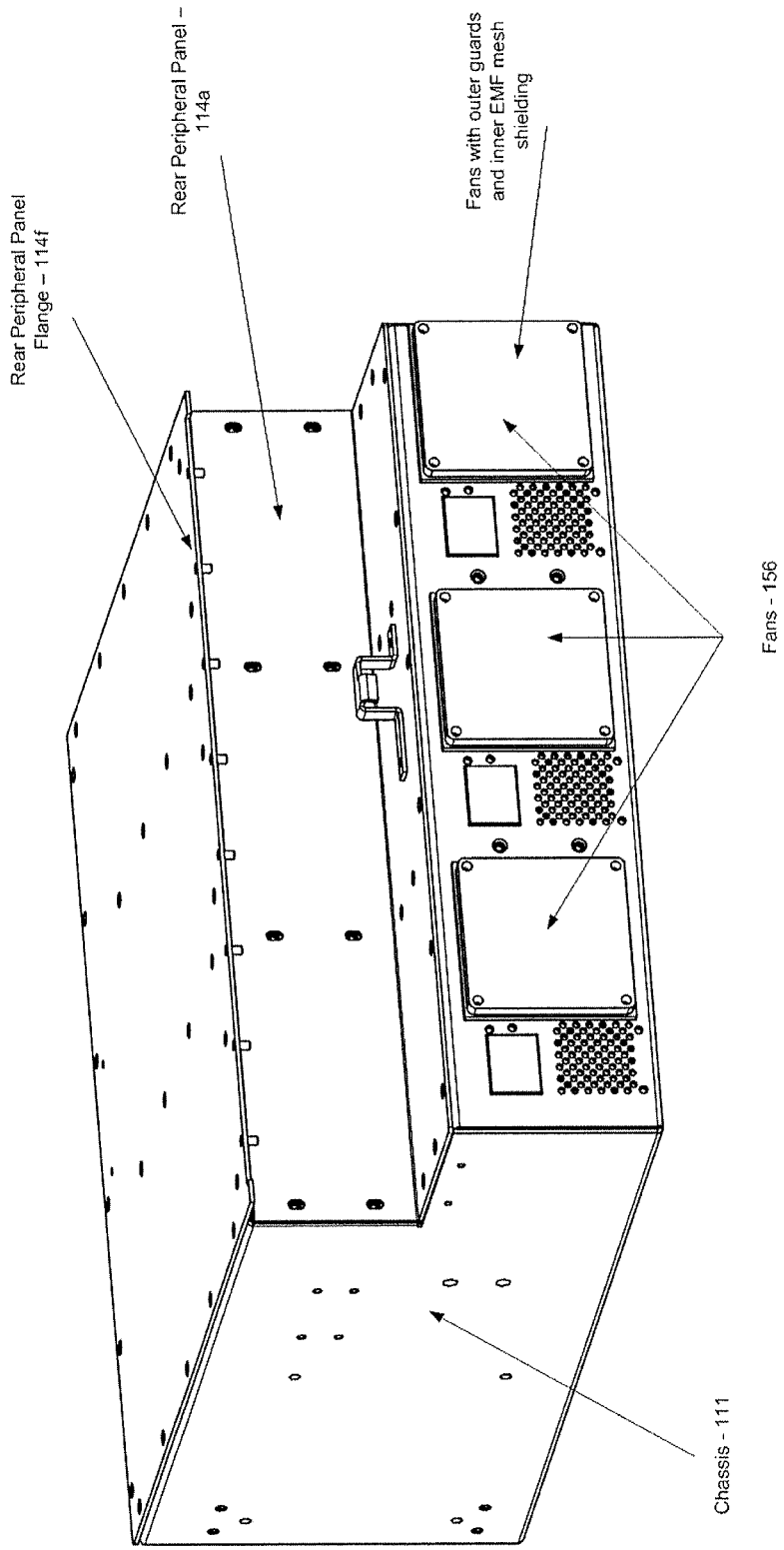
FIG. 5 illustrates a top view of a processing unit.

FIG. 5 shows the same chassis 111 as in FIG. 4, but with the rear peripheral panel 114a set in place on the chassis 111. Once in place, the rear peripheral panel 114a seals against an EMF gasket 157 (not shown), and provides a rear flange 114f for the top access cover 113 (not shown) when it is secured into place. Also note the fans and outer fan guards 156 have been installed in an outer portion of chassis 111. Between the fans and fan guards 156 may be a special EMF filter (much like an EMF filter on the front glass of a microwave) installed and grounded against the chassis 111 so the EMF filter is at the same electrical potential as the chassis.

Figure 6:
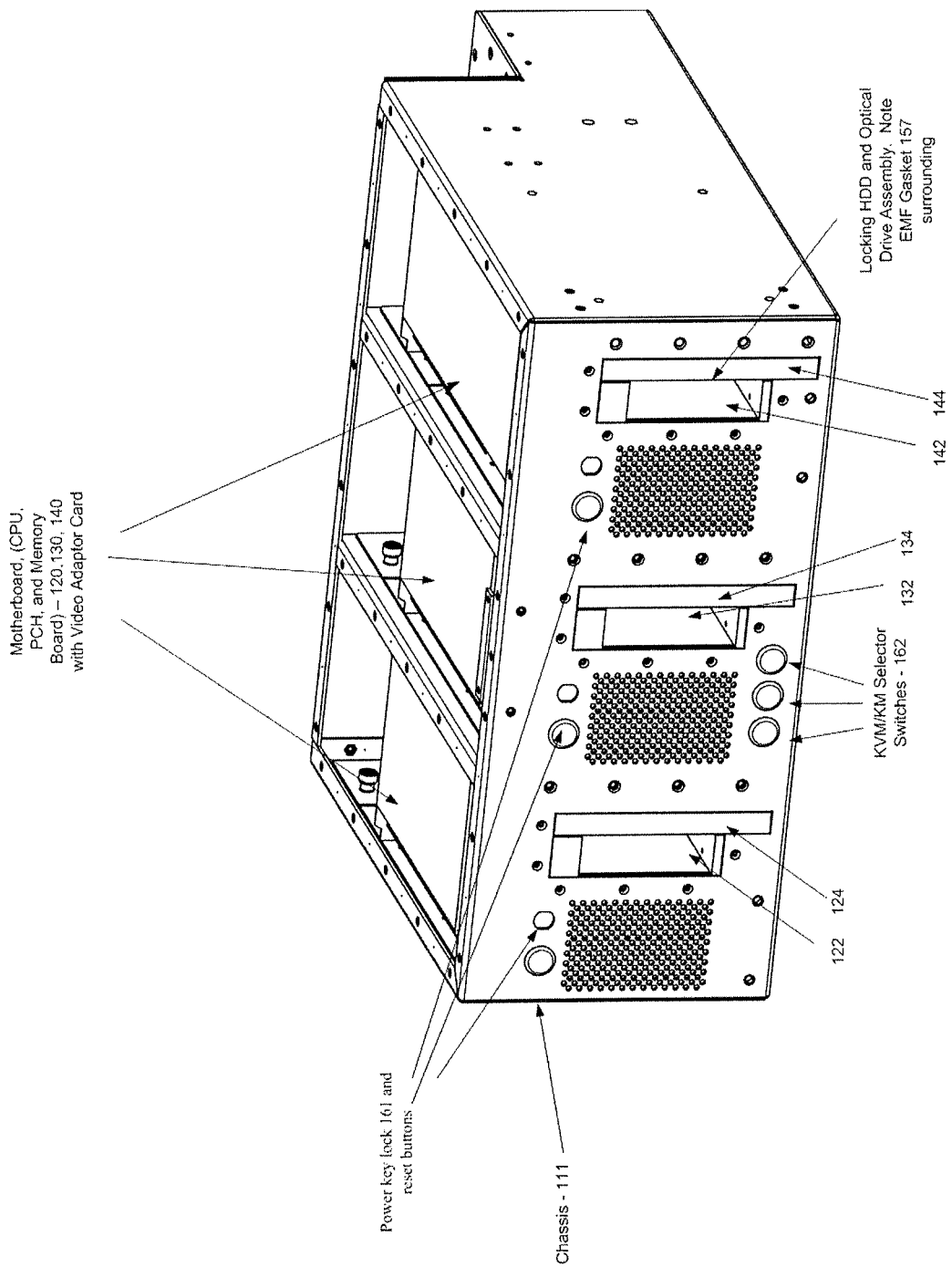
FIG. 6 illustrates a top view of a processing unit with a top cover removed.

FIG. 6 illustrates a front view of a fully populated outer chassis 111 with first and second walls 125, 135 in place, front 111a, rear peripheral panel 114a fastened, and computer domains 120, 130, 140 installed. This view permits note of devices, such as a locking HDD and an optical drive, associated or dedicated to a particular domain, which devices may be sealed or wrapped about with EMF gasket material 157. The chassis 111 may comprise a plurality of access covers, such as top access cover 113, rear peripheral cover 114, or other access panels or covers that provide or securely controls access (e.g., by mechanical lock) to controls of computer domains 120, 130, and 140 (e.g., ON/OFF, Reset, HDD, etc.).

Computer domains 120, 130, and 140 may optionally include card combo drives, whether cryptographic, or other smart card reader, PCMCIA slot or other such drive, etc. A smart card may be connected only on a secured domain which provides access to authorized users only, for example. In some embodiments, the MLS computer 110 may employ a separate smart card reader, such as a standard ISO7816 reader, allowing a user, such as a government agency, to select desired authentication software.

The computer domains 120, 130, and 140 may each comprise removable hard drives 122, 132, and 142. The removable hard drives 122, 132, and 142 may have built-in key/locks to allow removal for safe storage when the MLS computing unit 110 is not in use or is being transported between secure facilities. The computer domains 120, 130, and 140 may include CD/DVD combo drives 124, 134, and 144. Optionally, some embodiments may have computer domains 120, 130, and 140 with a dedicated power key lock 161 and/or reset buttons, so that a user may independently control or reset any of the computer domains 120, 130, and 140.

The KVM/KM selector switch 162 can allow a user to re-associate the keyboard and mouse and/or video among computer domains 120, 130, and 140. The KVM/KM switch 162 can be mechanical, electrical, or electromechanical, depending on the application.

The MLS computing unit 110 may further comprise one or more power key locks 161. The power key lock 161 is preferably electromechanical, and embodiments of a single power key lock 161 may be in the form of a master, with separate dedicated power control for each domain. A master might control all power to MLS computing unit 110, for example. The user may turn on or off one or more of the computer domains 120, 130, and 140 using power key lock 161. As noted above, a separate key lock may be included for each computer domains 120, 130, 140. A power key lock 161 may turn on or off all of the computer domains 120, 130, and 140 at once (i.e., a master), or it can affect only the domain selected by a KVM/KM selector switch 162, or embodiments may be provided with a power key lock 161 one per domain. Preferably the power key lock 161 is similar to the ignition key lock of a vehicle, i.e., a user must insert and preferably turn a key to turn the power on. Similarly, reverse turning and removing the key can turn the power off. The power key lock 161 may be configured to require that the key remain in the lock during operation of the MLS computing unit 110.

FIG. 7 illustrates a back view of a MLS computing unit 110. As discussed above, the unit 110 may be housed within a single chassis 111. The back 111e of the chassis 111 may comprise a rear peripheral cover 114. The rear peripheral cover 114 may include a rear peripheral cover lock 116 for securely closing the rear peripheral cover 114 and providing access control when locked.

The back 111e of chassis 111 may include a rear peripheral panel 114a with common interface ports corresponding to computer domains 120, 130, 140 of the MLS Computer 110. These may be individual panels or a single panel. The rear peripheral cover 114 may be opened to provide access to the rear peripheral panel 114a when the lock 116 is unlocked and the rear peripheral cover 114 is opened.

The common interface ports may preferably include normal computer peripheral ports, depending on the application. The ports may include: video outputs; video inputs; USB ports; keyboard and mouse ports; serial ports, network ports; and other suitable ports for interfacing with devices or the MLS computer 110, as may be desired. The rear peripheral cover 114 may include apertures, indentations, or openings to accommodate cables coupled to any of the ports of rear peripheral panel 114a. This enables the rear peripheral cover 114 to be closed and locked while various cables may remain securely coupled to ports. The openings may be large enough to accommodate the cables passing through them, but small enough to prevent attachment or detachment of cables when closed. The rear peripheral cover 114 prevents unauthorized users from manipulating network cables between the secured and unsecured domains as well as preventing removal of other devices such as video/keyboard/mouse cables.

The back 111e of the chassis 111 may further include vents for fans (not shown) of each of the computer domains 120, 130, and 140. Further, chassis 111 may include a power plug receptacle or receptacles for accepting an external power supply and a power switch. Additionally, chassis 111 may include an alarm switch 117 on an access panel to the internal components.

Figure 8:
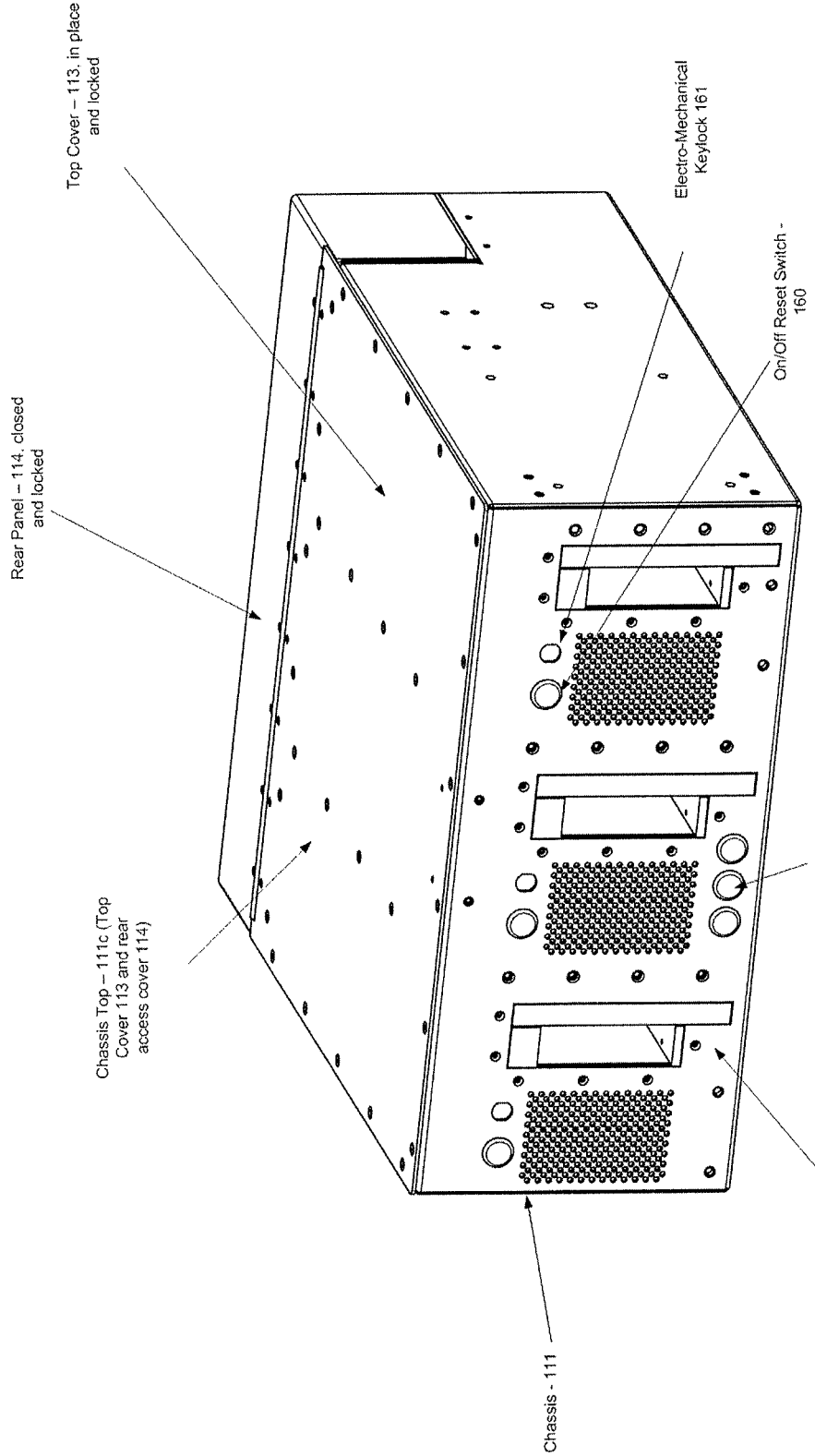
FIG. 8 is a front view of the chassis.

FIG. 8 illustrates an assembled embodiment of the MLS computing unit 110. Chassis 111 may have a top 111c that comprises a top access cover 113. The top access cover 113 may include a top cover lock 115 for access control. The top cover lock 115 is preferably mechanical. Unlocking the top cover lock 115 enables or permits access to the components such as the mother boards, memory, video cards, etc. of the computer domains 120, 130, and 140. Access to the key for the top cover lock may be restricted to authorized users. In lieu of a locking top, an alarm system may be used to alarm if the top is opened or used in conjunction with the locking top.

Figure 9:
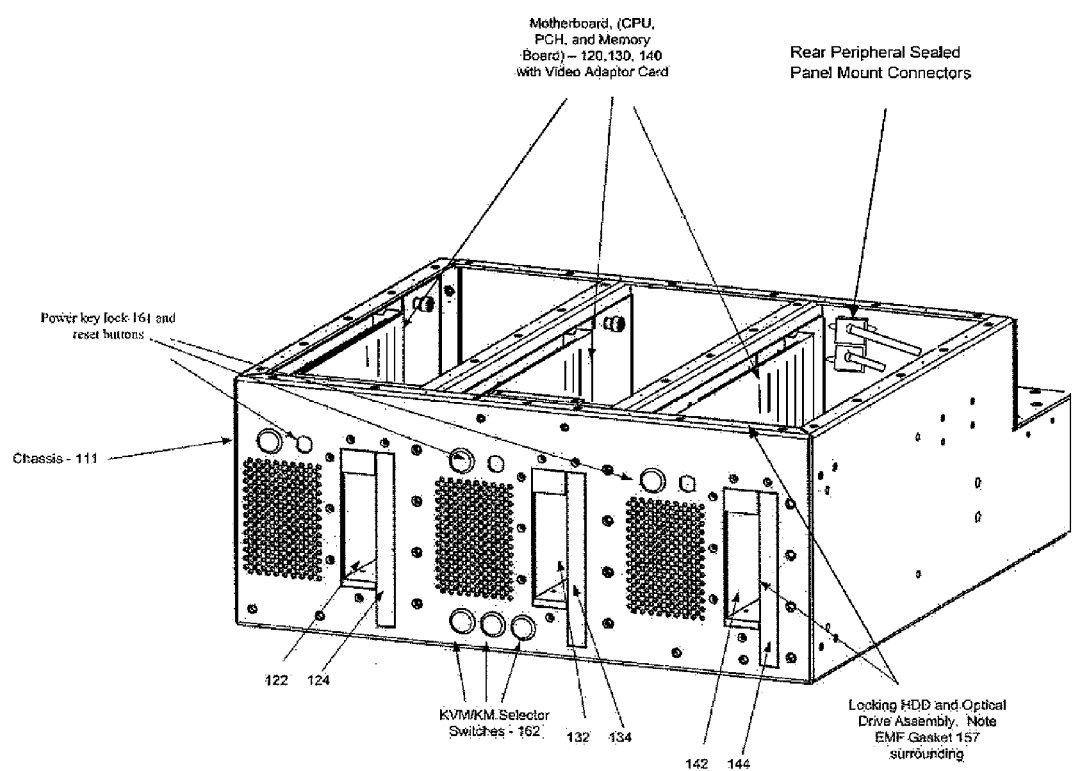
FIG. 9 illustrates an internal aspect of the unit.

FIG. 9 illustrates a front and top view of the MLS computer 110 with the top access cover 113 (not shown) removed. The computer domains 120, 130, and 140 are disposed within the case 111 and are separated by first and second internal EMF shields in the form of first and second walls 125, 135 of the chassis 111 structure. Each computer domain 120, 130, and 140 comprises the electronic processing components discussed above. The computer domains 120, 130, and 140 preferably include rear peripheral panel 114a located on the back 111e of the unit 110 enabling interface with the components of the domains.

Implementing a physical hardware access control of the specially constructed chassis 111 via a hardware lock/key cover for the front of the chassis 111 as well as the back, ensures a solid access control to the physical hardware itself, even before the computer might be turned on, as with an electro-mechanical power supply key lock.

All penetrations in the chassis 111 and internal chambers 121, 131, 141 for the purposes of switches or connectors 155 shall be isolated to either the front or rear of the chassis 111 to prevent as much of the radiated EMF from crossing boundaries between the compartments of the three isolated computers or from the field aligning outside of the external chassis and effecting another computer domain be effectively re-entering the chassis.

Where switches or connectors 155 penetrate the front or rear of the chassis 111, they may be composed of a material of similar properties of conductivity to the chassis 111. For instance, connectors 155 may be made of copper or brass with a nickel cladding or surface to disrupt the field as little as possible.

FIG. 9 is a detail of chassis 111 with KVM selector switch 162 shown, with chassis 111 open during assembly.

Aspects of some embodiments may be illustrated by describing optional access procedures. The MLS computer 110 may be accessed by inserting a physical key into a mechanical key lock on a cover mounted on chassis 111, possibly with a tamper-proof metal hinge. Upon opening the cover and powering-on MLS computer 110, computer domains 120, 130, and 140 may then become active and access to an unsecured domain, optionally such as computer domain 140, may be provided as a default configuration.

Access to the secured domains in some embodiments, optionally such as computer domains 120 and 130 may be restricted by smart card, for example. An authorized user might be required to enter a personal ID card into a smart card reader to be allowed access to the secured computer domains 120 and 130. A personal identification number may be required entered and validated, so then a user may proceed and access the secured computer domains 120 and 130, or perhaps a classified network. When an authorized user wishes to switch to the unsecured computer domain 140, the user may select the desired by toggling KM or KVM selector switch 162. The authorized user can switch back to the secure domain by pressing the secured button on the domain selection switch 162 within less than a second without re-powering or re-booting domains and without a loss of data on either domain.

In some embodiments, the security features of the MLS computer 100 may include access control, identification, authentication, and switching mechanisms that are entirely hardware based. Access control may require a key administrator with an access key #1 to unlock a cover for access (e.g., top access cover 113) and a user with access key #2 to turn on the system by inserting the key #2 into a power key lock. The key administrator may also use access key #1 to unlock the any cover locks, allowing access to items such as cable connections, rear peripheral panel 114a, etc., in order to maintain network cables and other hardware connections. Optionally, authorized users with possession of an access key #3 may unlock and remove a removable hard drive from computer domains 120, 130, and 140.

One optional aspect of such embodiments is that once a key administrator unlocks a cover with key #1 and a user turns on the computer with key #2, the user may then operate the default unsecured domain, such as computer domain 140. To access the classified secure domains, such as computer domains 120 and 130, the user may be required to initiate identification and authentication access control by inserting a smart card into a reader. After the smart card has been authenticated, a user may be required to enter a valid PIN number issued by the key administrator before being allowed to access secure computer domains 120 and 130.

Once access is granted, optionally data stored on any hard drives of secured computer domains 120 and 130 may be encrypted/decrypted, for example, with a FIPS 140-2 certified cryptographic card. Cryptographic cards may be uniquely serial numbered to its MLS computer 110. Upon shutdown, a user may use access key #3 to remove drives or other media to store them in a secure location.

In some embodiments, when only an unsecured domain, such as computer domain 140 is accessed, a user may be limited to information within that domain. Consequently, the display system 150 may be limited to display information from the unsecured domain 140. When one of the secured domains, such as computer domains 120 and 130 is accessed, the user may access information with the secured domain and the unsecured domain. Therefore, display system 150 may present information from the secured domain and the unsecured domain 140. For example, if a secured domain is accessed, monitor system 150 may display the desktop of the secured domain and the unsecured domain.

Optionally, chassis 111 may have a cover alarm that can sound in the event of an unauthorized removal of top cover 113. A key administrator may turn the cover alarm off by, for example, inserting key #2 into the alarm switch, which might be located at the rear 111e of the chassis 111.

As indicated above, one embodiment of the MLS computing system 100 may comprise an MLS computing unit 110 with three compartmentalized and independent hardware-based domains, each with a dedicated power supply hardwired to electrical communication solely within its domain. For example, first computer domain 120 may have power supply 120d separated from other power supplies 130d, 140d by the respective Faraday cage, and primarily first and second walls 125, 135 as electromagnetic field shields. In particular, dedicated power supplies avoids signals from travelling though shared wiring or other electrical components.

One embodiment of the MLS computing unit 110 may include combinations of the following components: chassis 111 as an SSI case; Domain selector switch 4 port; SSI power pack; Processor/CPU—Intel Pentium IV.times.3; Motherboard—Industrial P4.times.3; Chipset—Intel 440BX; BIOS: 2 MB AMI Flash BIOS and APM 1.2, DMI 2.1, Plug and Play; Memory—1 GB DDR 333.times.3; Video—(64 MB) Intel (build-in); Hard Drives: 80.0 GB ATA 3.5" (removable, Unsecured domain), 80.0 GB ATA 2.5" (removable, first secure domain), 80.0 GB ATA 2.5" (removable, second secure domain), 3.5-inch removable SECURE hard drive case.times.3, CD-ROM: CD-ROM drive.times.2 (slim, first and second secure domains); DVD/CDRW drive.times.1 (slim, unsecured domain); Network Interface Card (NIC)—Intel.times.3; Keyboard—STC E05300; Mouse or Trackball; Monitor—LCD.times.3; Sound Card—Creative SB 16; Speakers—Mli-699; tamper-proof case; SmartCard identification and authentication drive.times.2 (3d optional); operating system—Windows XP Pro; keys #1, 2, 3 (one set).

Optionally, the keys used in an MLS computing system 100 may be illegal to duplicate and may be clearly identified on the face of each key as being illegal to duplicate. Additionally, each key may be unique to a corresponding lock such that no two systems may be accessed the same key. In another contemplated embodiment, a single key may be employed per MLS computing unit 110 that can access all of the locks associated with the chassis 111 and MLS computing unit 110.

While the various embodiments of this invention have been described in detail with particular reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all applicable equivalents.

It is claimed:

1. A multi-level security computing system, comprising:
   a chassis having a front, top, bottom, and two sides, each comprising an electromagnetic shield;
   a first computer domain comprising a first motherboard, a first dedicated bus, a first processor, a first data storage device, and a first dedicated power supply;
   a second computer domain comprising a second motherboard, a second dedicated bus, a second processor, a second data storage device, and a second dedicated power supply;
   a third computer domain comprising a third motherboard, a third dedicated bus, a third processor, a third data storage device, and a third dedicated power supply;
   the first, second, and third computer domains enclosed within the chassis, with a first internal electromagnetic field shield located inside the chassis and interposed between the first computer domain and the second computer domain to prevent data migration between the first computer domain and the second computer domain, and a second internal electromagnetic field shield located inside the chassis and interposed between the second computer domain and the third computer domain to prevent data migration between the second computer domain and the third computer domain;
   wherein the first and second internal electromagnetic shields comprise respectively a first and second wall with the first wall having a first perimeter and the second wall having a second perimeter, the first perimeter in operable engagement with the chassis defining a first seam between the first perimeter of the first wall and the chassis, the chassis and first wall configured with a first flange along the first seam to occlude an electromagnetic field from the first or second computer domain incident on the first seam, the second perimeter in operable engagement with the chassis defining a second seam between the second perimeter of the second wall and the chassis, the chassis and second wall configured with a second flange along the second seam to occlude an electromagnetic field from the second or third computer domain incident on the second seam;
   the first computer domain, the second computer domain and the third computer domain being separated and electrically isolated so that no information is shared between any of the first computer domain, the second computer domain, and the third computer domain; and
   the chassis with the first and second electromagnetic field shields being configured to form a first, second, and third Faraday cage about the first, second, and third computer domains respectively.

2. The multi-level security computing system of claim 1, wherein the chassis and the first and second electromagnetic field shields are fabricated of an aluminum alloy.

3. The multi-level security computing system of claim 1, further comprising: one or more user data input devices; a user data input selector switch for alternatively coupling the one or more user data input devices to the first computer domain, the second computer domain, and the third computer domain without rebooting any of the first computer domain, the second computer domain, or the third computer domain; and wherein the first computer domain, the second computer domain, and the third computer domain are adapted to be operational at the same time.

4. The multi-level security computing system of claim 3, wherein the one or more user data input devices comprise a keyboard and a mouse.

5. The multi-level security computing system of claim 1, wherein at least one of the second computer domain and the third computer domain is a secure computer domain and the multi-level security computing system further comprising a smart card access controller for authenticating users prior to allowing access to the secure computer domain.

6. The multi-level security computing system of claim 5, wherein the first domain may be accessed by a user without smart card authentication.

7. The multi-level security computing system of claim 1, further comprising: a key-lock power switch having an associated key for powering on the first computer domain, the second computer domain, and the third computer domain.

8. The multi-level security computing system of claim 1, further comprising:
- a first reset button for resetting the first computer domain without resetting the second computer domain or the third computer domain;
- a second reset button for resetting the second computer domain without resetting the first computer domain or the third computer domain; and
- a third reset button for resetting the third computer domain without resetting the first computer domain or the second computer domain.

9. The multi-level security computing system of claim 1, wherein the total power consumption of the first computer domain, the second computer domain, and the third computer domain are no more than 150 watts.

10. The multi-level security computing system of claim 9, wherein the total power consumption of the first computer domain is no more than 50 watts.

11. The multi-level security computing system of claim 1, wherein the total power consumption of the first computer domain, the second computer domain, and the third computer domain are no more than 105 watts.

12. The multi-level security computing system of claim 11, wherein the total power consumption of the first computer domain is no more than 35 watts.

13. The multi-level security computing system of claim 1, further comprising a top panel lock for controlling access to internal components of the computer through a top panel.

14. The multi-level security computing system of claim 1, further comprising EMF gasket material interposed between the first and second flanges and the chassis.

15. The multi-level security computing system of claim 1, further comprising a display having a first video monitor adapted to display information from the first computer domain, a second video monitor adapted to display information from the second computer domain, and a third video monitor adapted to display information from the third computer domain, wherein the first, second, and third video monitors are adapted to simultaneously display information.

16. The multi-level security computing system of claim 1, the chassis adapted to mount to a standardized 19-inch rack.

17. The multi-level security computing system of claim 1, the chassis having a plurality of access covers including a top cover and a back cover for providing access to at least a portion of the interior of the chassis and a top cover lock for preventing unauthorized access to the chassis through the top cover; and a back cover lock for preventing unauthorized access to the chassis through the back cover.

\* \* \* \* \*